March 6, 1962 W. C. LANNING 3,024,418

ELECTRONIC PROGRAMMING CIRCUIT

Filed Aug. 29, 1956 2 Sheets-Sheet 1

INVENTOR
WALTER C. LANNING
BY R. J. Braddock
ATTORNEY

INVENTOR
WALTER C. LANNING
BY R. J. Braddock
ATTORNEY

United States Patent Office 3,024,418

Patented Mar. 6, 1962

3,024,418

ELECTRONIC PROGRAMMING CIRCUIT

Walter C. Lanning, Plainview, N.Y., assignor to Sperry Rand Corporation, a corporation of Delaware Filed Aug. 29, 1956, Ser. No. 606,893

4 Claims. (Cl. 328—122)

The invention relates to electronic programming circuits and more specifically to a digital distributor adapted to operate in a forward or reverse sequence of steps and having provision for varying the increments between said steps in both directions.

The need for variable programming circuits is well established in the communication and computer arts. Variations of the programming circuits are virtually unlimited, being as boundless as are the particular objectives of the systems to be controlled. One representative problem that exists in the communication art, for example, involves selectively coupling a signal source to a plurality of discrete transmission channels as a function of programmed selective coupling apparatus. More specifically, it is sometimes desired that the programming sequence progress in equal steps but with variable increments between steps. That is, it may be desired that the signal source be coupled to the various transmission channels in 1, 2, 3 . . . fashion in one mode of operation. In a second mode, it may be required that said sequential coupling of the source to the communication channels proceed in a 2, 4, 6 . . . order. In still another mode of operation it may be desirable that said coupling proceed in a reverse sequence, e.g., 7, 6, 5 . . . .

It is the general object of the present invention to provide a programming control for selective coupling apparatus.

A more specific object is to provide a variable digital electronic distributor.

Yet another object is to provide a digital electronic distributor adapted to produce variable increments.

A further object is to provide a reversible digital electronic distributor adapted to produce variable increments both in the forward and reverse directions.

These and other objects, which will become more apparent as the description proceeds, are basically achieved by the use of a first binary counter chain, adapted to receive incoming trigger pulses at any one or at any combination of its component stages. For example, if the incoming pulses were applied to the units stage of the first binary counter chain, the binary counter would respond to each individual pulse in a conventional fashion so as to be placed in a final status wherein the individual component stages are in positions indicative of the binary number corresponding to the number of input pulses. On the other hand, if the input pulses are applied to the two's stage rather than to the unit's stage, the binary counter would "count" in steps of two rather than in steps of units.

The present invention involves the use of a second binary chain which controls the application of input pulses to the first binary chain in accordance with the binary number stored in the second binary chain. For example, the second binary chain may receive one or more input pulses whereby the individual component stages thereof will be placed in states corresponding to the binary equivalent of the number of input pulses. Each individual stage of the second binary chain is coupled to respective gates, through which the input pulses to corresponding stages of the first binary chain flow. Said gates will be in a conducting or non-conducting state depending on the binary number stored in the second chain. Thus, the pulse input to the first binary chain will be applied to individual stages thereof corresponding to the conducting gates.

For example, if a count of one is stored in the second chain, a first gate associated with the first stage of the second chain will conduct thereby coupling the input pulses to the first chain to the first stage thereof and at no other point. The first chain will then count in incremental steps of units. Should the second chain have the number 2 stored therein, a second gate associated with the second stage of the second chain will be rendered conductive thus directing the flow of incoming pulses to the second stage of the first chain and at no other point thereof. The first chain will now count in increments of two units.

The reversing feature of the present invention may be achieved by selectively controlling the flow of carry pulses along the first counter chain. Means may be provided similar to that disclosed in U.S. Patent 2,656,-106 issued to H. P. Stabler on October 20, 1953, and described beginning in column 4, line 9, thereof. Said means for reversing does not, per se, form a necessary part of this invention. Alternatively, the first counter chain may be caused to count "backward," for example, in steps of unit, by causing it to count "forward" in incremental steps of one less than its maximum numerical capacity. That is, assuming a three stage binary chain having a total numerical capacity of eight, if said chain counts "forward" in steps of seven, according to the present invention, the binary count stored therein will proceed in the reverse sequence of 0, 7, 6, 5, 4, 3, 2, 1, 0, 7, etc.

In a representative application of the present invention, selective coupling apparatus is controlled in accordance with the number stored in the first binary chain. One representative selective coupling apparatus, particularly adaptable to the variable digital distributor of the present invention, is a "tree" arrangement of coincidence gates which will provide discrete transmission paths according to each respective digital number stored in the first counter chain. Thus, the selective coupling apparatus in combination with the digital distributor of the subject invention will provide programmed selective coupling apparatus connecting a signal source to a plurality of discrete transmission channels in any forward or reverse sequence of equal but variable increments.

Figure 1:
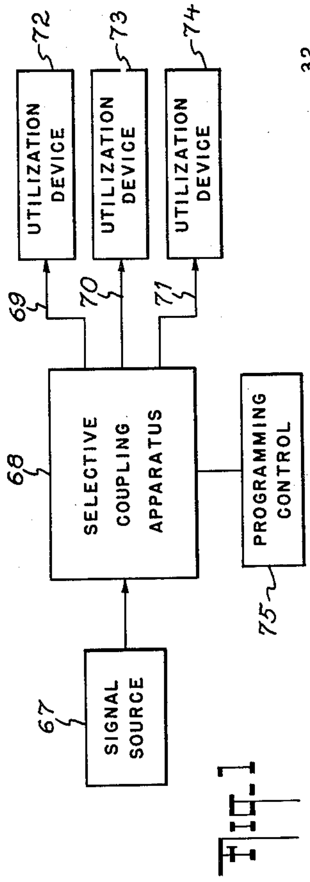
FIG. 1 is a representative, but not limiting, system in which the present invention has particular utility.

In FIG. 1, a signal source generally represented by the numeral 67 is connected by means of selective coupling apparatus 68 to a plurality of discrete communication channels represented by leads 69, 70 and 71 to individual utilization devices 72, 73 and 74. The sequence with which signal source 67 is connected to said utilization devices is controlled by programming control 75. According to the present invention, programming control 75 accomplishes the connection of signal source 67 to utilization devices 72, 73 and 74 in any forward (72, 73, 74) or reverse (74, 73, 72) order in increments, in either direction, which may be unity or any multiple thereof.

Figure 2:
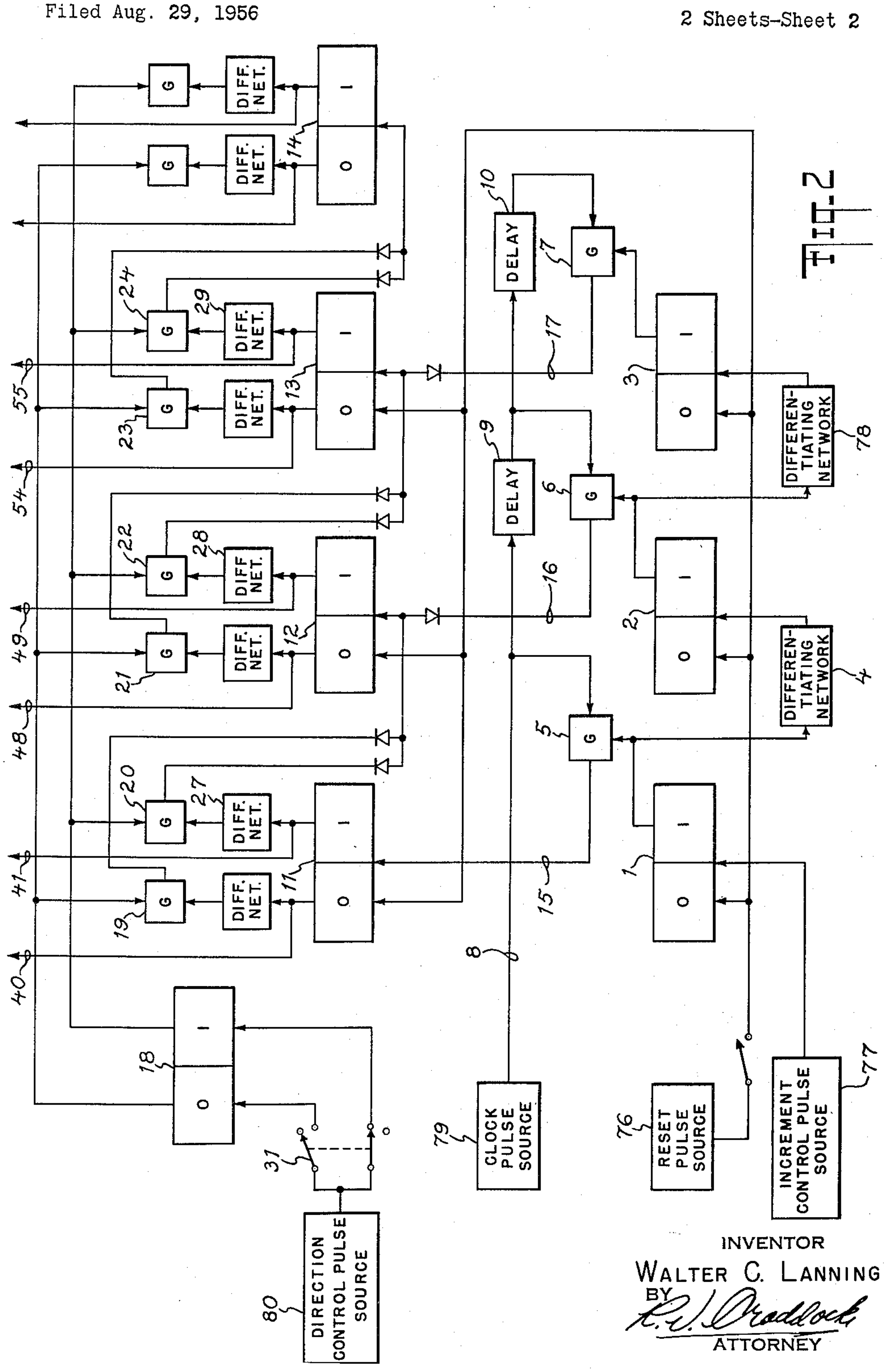
FIG. 2 is a preferred embodiment of the present invention.

FIG. 2 discloses in functional block detail the components of programming control 75 of FIG. 1 which is the present invention. A first binary counter chain is provided by a serial arrangement of flip-flops designed by blocks 1, 2 and 3. Reset pulse source 76 places said first binary chain and a second binary chain to be later described into a zero reference status as indicated. The first chain responds to increment control pulse source 77 which is connected simultaneously to both grids, for example, of flip-flop 1. Flip-flop 1 produces an output when its status is switched from one to zero. Said output is differentiated by network 4 and in turn applied to both grids of flip-flop 2. Flip-flop 2 also produces an output when its status is switched from one to zero which output is differentiated by network 78 and then applied to both grids of flip-flop 3. Thus, the binary chain comprised of flip-flops 1, 2 and 3 respond in conventional fashion to the applied increment control pulses.

The undifferentiated (square wave) outputs from flip-flops 1, 2 and 3 and applied respectively to coincidence gates 5, 6 and 7, second inputs to which are derived from clock pulse source 79. Said clock pulse source produces a train of uniformly spaced pulses which are applied via lead 8 directly to gate 5, indirectly through delay 9 to gate 6 and indirectly through delays 9 and 10 to gate 7. Gates 5, 6 and 7 conduct in response to predetermined voltages appearing on the respective plates, for example, of flip-flops 1, 2 and 3 which correspond to the binary number stored in the chain comprised of flip-flops 1, 2 and 3.

The clock pulses are applied to a second binary chain comprised of flip-flops 11, 12 and 13 via leads 15, 16 and 17, depending on the state of conduction or non-conduction of gates 5, 6 and 7. The delays 9 and 10 are of equal magnitude so that the clock pulses are increasingly delayed as they are applied via leads 15, 16 and 17 to allow for normal operation of the second binary chain in response thereto. Said delays are not required where the inherent delays in the normal carry operation of flip-flops 11, 12 and 13 are sufficiently different from the delays in operating gates 5, 6 and 7 so as to preclude the simultaneity of the carry pulses and the gated pulses at any stage of the second binary chain. Additional flip-flop 14 is shown to indicate that the second binary chain may be extended to greater length while not exceeding the bounds of the present invention.

The second binary chain will count in a forward or reverse sense depending on the state of flip-flop 18 which controls the conduction or non-conduction of coincidence gates 19, 20, 21, 22, 23 and 24. When flip-flop 18 is in a state of one, gates 20, 22 and 24 will be caused to conduct. Gates 20, 22 and 24 receive second inputs when the states of respective flip-flops 11, 12 and 13 undergo a one-to-zero transition. The outputs of flip-flops 11, 12 and 13 when undergoing said transition are differentiated respectively by differentiating networks 27, 28 and 29. Thus, when the second chain is counting in the forward sense, the carry pulses to each succeeding stage will be derived from the preceding stage when leaving the state of one. To reverse the sense of count of the second binary chain, flip-flop 18 is placed in the state of zero by means of direction control pulses source 80 which are applied via reversing switch 31. Whein flip-flop 18 is in the state of zero, gates 19, 21 and 23 are caused to conduct thus connecting zero-to-one carry pulses to successive binary stages. A discussion of such a reversible binary counter is given in Patent No. 2,656,106 issued to H. P. Stabler on October 20, 1953, beginning on line 9 of column 4.

The second binary chain comprised of flip-flops 11, 12 and 13 as discussed in the foregoing finally will have a count stored therein determined by the product of the number of clock pulses applied thereto and the count stored in the first binary chain comprised of flip-flops 1, 2 and 3. The transient numbers appearing in the second binary chain thus have incremental differences therebetween the magnitudes of which are controlled by the first binary chain and the sense of which is controlled by flip-flop 18.

Figure 3:
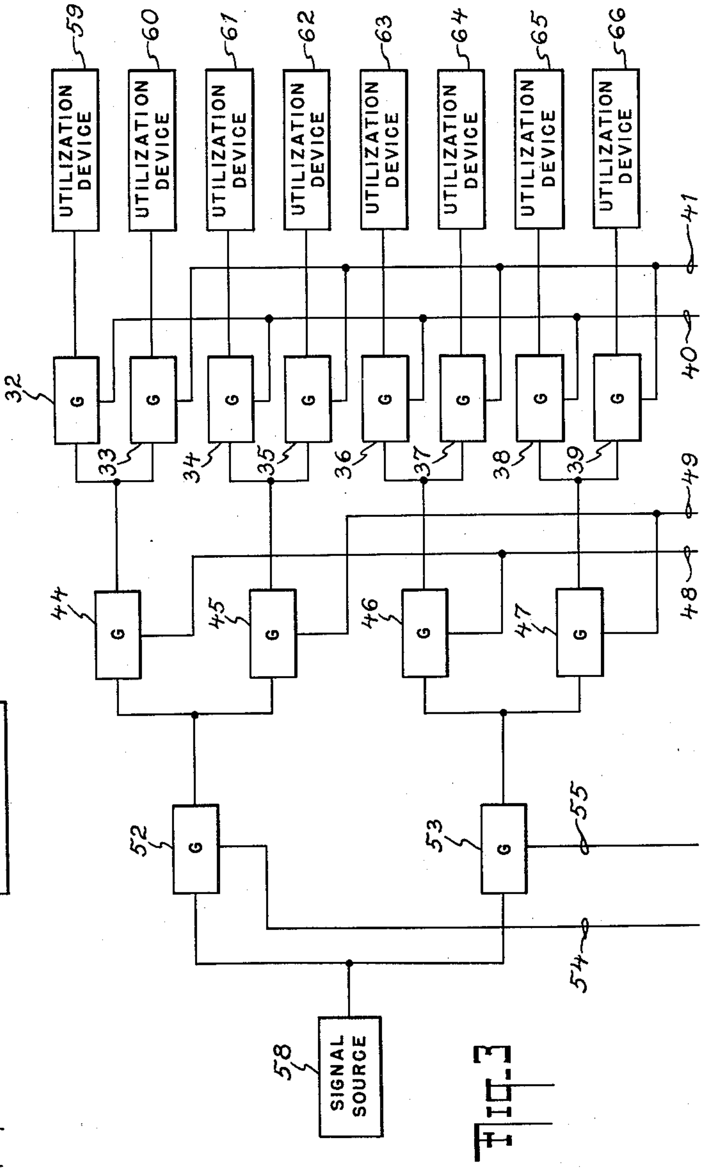
FIG. 3 is a representative selective coupling apparatus particularly suited for use with the present invention.

A representative selective coupling apparatus particularly adaptable to the present invention, is shown in FIG. 3. Coincidence gates 32, 33, 34, 35, 36, 37, 38 and 39 are alternately connected to each other as shown by leads 40 and 41. Leads 40 and 41 correspond to leads 40 and 41 of FIG. 2. Coincidence gates 44, 45, 46 and 47 are likewise alternately connected to each other by means of leads 48 and 49. Leads 48 and 49 correspond to leads 48 and 49 of FIG. 2. Coincidence gates 52 and 53 are respectively connected to leads 54 and 55 also shown in FIG. 2.

FIG. 2, in combination with the conventional conversion and coupling apparatus of FIG. 3, provides selectively programmed transmission paths between the signal source 58 of FIG. 3 and individual utilization devices 59 through 66. The paths are determined by respectively corresponding states of conduction of flip-flops 11, 12 and 13 of FIG. 2.

For purposes of exemplifying the operation of the apparatus of FIG. 2, let it be assumed that a count of one is stored in the first binary chain comprised of flip-flops 1, 2 and 3 of FIG. 2. In such a case, flip-flop 1 will be in state 1; flip-flop 2 will be in state 0; and flip-flop 3 will be in state 0. As previously mentioned, gates 5, 6 and 7 conduct in response to predetermined voltages appearing on the respective plates, for example, of flip-flops 1, 2 and 3 which correspond to the binary numbers respectively stored therein, i.e., to the respective states of conduction of flip-flops 1, 2 and 3.

In the assumed case where only flip-flop 1 is in state 1, only gate 5 will be rendered conductive. The clock pulses produced by source 79 will be directed solely to the trigger input of flip-flop 11 via lead 15. The second binary chain comprised of flip-flops 11, 12 and 13 thereupon proceeds in conventional fashion to count in steps of unity the number of pulses produced by source 79.

If the number two is stored in the first binary chain, only flip-flop 2 will be in state 1. Consequently, only gate 6 will be rendered conductive with the result that pulses produced by source 79 will be directed solely to the trigger input of flip-flop 12 by means of conducting gate 6 and lead 16. It will be apparent that the application of a number of pulses N to the "two's" stage (flip-flop 12) of the second binary chain causes a number to be stored therein which is equivalent to the number that would be stored in the event that 2 N pulses were instead applied to the "one's" stage (flip-flop 11). Thus, when the pulses of source 79 are applied solely to the trigger input of flip-flop 12 by conducting gate 6 and lead 16, the second binary chain comprised of flip-flops 11, 12 and 13 may be said to count in incremental steps of two relative to the incremental steps of unity that would result if the pulses of source 79 were instead applied to the trigger input of flip-flop 11.

In the operation of the apparatus of FIGS. 2 and 3, if a count of one is stored in the first binary chain comprised of flip-flops 1, 2 and 3 of FIG. 2, signal source 58 will be sequentially connected to utilization devices 59, 60, 61, 62, 63, 64, 65 and 66. If two increment control pulses are applied to said first chain of FIG. 2, signal source 58 of FIG. 3 will be sequentially connected to utilization devices 59, 61, 63 and 65. The forward sense of sequence may be reversed by throwing reversing switch 31 of FIG. 2 to its alternative position. Under the same remaining conditions of the first binary chain of FIG. 2 just described, the utilization devices will be sequentially energized in a 59, 66, 65, 64, 63, 62, 61, 60 and 59, 65, 63, 61 fashion, respectively.

It will be noted that the objects of the present invention have been accomplished by the provision of a first and a second binary counter chain, the first chain acting as an increment control for the second chain. Provision is also made in the present invention for varying the incremental steps followed by the second chain as a function of the count stored in the first chain. Provision has also been made for the reversal of the sense of sequence of the second binary chain by means of a switching device which selectively couples "zero" state or "one" state carry pulses to successive stages in the second binary chain.

While the digital programming aspect of the present invention has been emphasized in the above description, it is recognized that the invention is also useful as a multiplier. As suggested by additional stage 14 of the second binary chain of FIG. 2, said second chain may be extended to lengths greater than that of the first binary chain comprising flip-flops 1, 2 and 3. If the numerical capacity of the second chain is made greater than the product of the numerical capacity of the first chain and the number of pulses applied to the second chain, the invention operates to produce a binary number in the second chain corresponding to the number of pulses applied thereto multiplied by the increment control factor stored in the first chain in binary form.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Apparatus comprising a multiple stage digital data storage means, each of the component stages of said storage means producing an output signal representing a predetermined value of a respective significant digit stored therein, means for actuating said storage means for placing signals therein representing a stored predetermined digital number, a source of pulses, a digital counter chain having a plurality of trigger inputs each for triggering a respective one of the component stages thereof from one to the next of a sequence of distinguishable states, and a plurality of switching means connected to said pulse source and to said counter chain, each said switching means selectively directing when actuated the flow of pulses from said pulse source to the trigger input of a respective one of said component stages of said counter chain in response to the output signal of a respectively associated one of said plurality of stages of said storage means, said output signals of said storage means being applied to respective ones of said switching means for the actuation thereof.

2. Apparatus comprising a first digital counter chain producing a plurality of output signals each representing a predetermined one of the states of a respective component stage thereof, means for actuating said first counter chain for placing each component stage into a predetermined state, a source of pulses, a second digital counter chain having a plurality of trigger inputs each for triggering a respective one of the component stages thereof from one to the next of a sequence of distinguishable states, and a plurality of switching means connected to said source of pulses and to said second counter chain, each of said switching means selectively directing when actuated the flow of pulses from said source of pulses to the trigger input of a respective one of said component stages of said second chain in response to the output signal of a respectively associated one of said component stages of said first counter chain, said output signals of said first counter chain being applied to respective ones of said switching means for the actuation thereof.

3. Apparatus comprising first and second sources of pulses, a first digital counter chain having an input for triggering the lowest order significant stage thereof and producing a pluraliy of output signals each representing a predetermined one of the states of the repsective component stage thereof, the pulses of said first source being applied to said input of said first counter chain whereby a predetermined count is placed in said first counter chain, a second digital counter chain having a plurality of trigger inputs each for triggering a respective one of the component stages thereof from one to the next of a sequence of distinguished states, and a plurality of switching means connected to said second source and to said second counter chain, each of said switching means selectively directing when actuated the flow of pulses from said second source to the trigger input of a respective one of said component stages of said second counter chain in response to the output signal of a respectively associated one of said component stages of said first counter chain, said output signals of said first counter chain being applied to respective ones of said switching means for the actuation thereof.

4. Apparatus comprising first and second sources of pulses, a first digital counter chain having an input for triggering the lowest order signficant stage thereof and producing a pluraliy of output signals each representing a predetermined one of the states of a respective component stage thereof, the pulses of said first source being applied to said input of said first counter chain, a second digital counter chain having a plurality of trigger inputs each for triggering a respective one of the component stages thereof from one to the next of a sequence of distinguishable states, a plurality of switching means connected to said second counter chain, each of said switching means selectively directing when actuated the flow of pulses from said second source to the trigger input of a respective one of said component stages of said second chain in response to the output signal of a respectively associated one of said component stages of said first counter chain, said output signals of said first counter chain being applied to respective ones of said switching means for the actuation thereof, and delay means for the connecting of all but one of said switching means to said second source.

References Cited in the file of this patent

UNITED STATES PATENTS

| | | |
|---|---|---|
| 2,594,731 | Connolly | Apr. 29, 1952 |
| 2,651,718 | Levy | Sept. 8, 1953 |
| 2,656,106 | Stabler | Oct. 20, 1953 |
| 2,686,299 | Eckert | Aug. 10, 1954 |
| 2,731,201 | Harper | Jan. 17, 1956 |
| 2,731,631 | Spaulding | Jan. 17, 1956 |
| 2,734,684 | Ross | Feb. 14, 1956 |
| 2,735,005 | Steele | Feb. 14, 1956 |
| 2,740,106 | Phelps | Mar. 27, 1956 |
| 2,745,006 | Chu et al. | May 8, 1956 |
| 2,792,991 | De Chambio | May 21, 1957 |
| 2,812,134 | Adellaar | Nov. 5, 1957 |
| 2,910,237 | Meyer et al. | Oct. 27, 1959 |

OTHER REFERENCES

Article "An Operational-Digital Feedback Divider," by Meyer et al. in Transactions of IRE on Electronic Computers, vol. EC 3, No. 1, March 1954, pp. 17–20.